(12) United States Patent
Fussell

(10) Patent No.: US 6,705,887 B1
(45) Date of Patent: Mar. 16, 2004

(54) ELECTRICAL EXTENSION LEAD OR ADAPTER

(76) Inventor: Ian Clarke Fussell, Meadow Cottage, Underhill Lane, Ditchling, East Sussex, BN6 8XE (GB)

( * ) Notice: Subject to any disclaimer, the term of this patent is extended or adjusted under 35 U.S.C. 154(b) by 0 days.

(21) Appl. No.: 09/937,526
(22) PCT Filed: Mar. 22, 1999
(86) PCT No.: PCT/GB99/00904
§ 371 (c)(1), (2), (4) Date: Dec. 31, 2001
(87) PCT Pub. No.: WO00/57526
PCT Pub. Date: Sep. 28, 2000

(51) Int. Cl.$^7$ ............................................. H01R 11/00
(52) U.S. Cl. ................................. 439/501; 439/502
(58) Field of Search ................. 439/501, 502, 439/369, 371; 191/12.2 R, 12.4; 242/400.1, 96, 54 R

(56) References Cited

U.S. PATENT DOCUMENTS

| 2,143,529 A | * | 1/1939 | White | 206/16 |
| 4,282,954 A | * | 8/1981 | Hill | 191/12.4 |
| 4,467,979 A | * | 8/1984 | Koehler | 242/96 |
| 4,520,239 A | * | 5/1985 | Schwartz | 191/12.4 |
| 4,917,625 A | * | 4/1990 | Haile | 439/358 |
| 5,716,219 A | * | 2/1998 | Noike | 439/31 |
| 6,164,582 A | * | 12/2000 | Vara | 242/395 |
| 6,428,348 B1 | * | 8/2002 | Bean | 439/501 |

* cited by examiner

Primary Examiner—Alexander Gilman
(74) Attorney, Agent, or Firm—The Weintraub Group, P.L.C.

(57) ABSTRACT

An electrical adapter includes a plug, a socket and an extension lead connecting the socket to the plug. The socket is disposed in a body around which the lead is windable such that so long as the lead is at least partially wound, insertion is prevented of a pin of a connector in a socket hole to prevent unwanted electrical connection to the connector.

16 Claims, 5 Drawing Sheets

Figure 1:
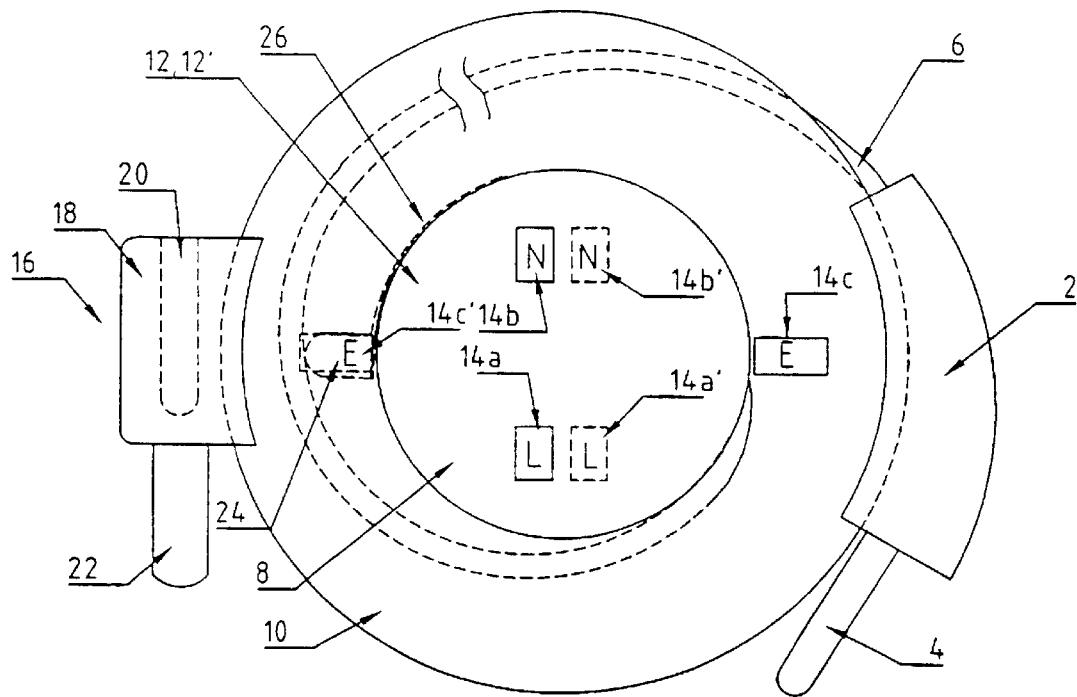

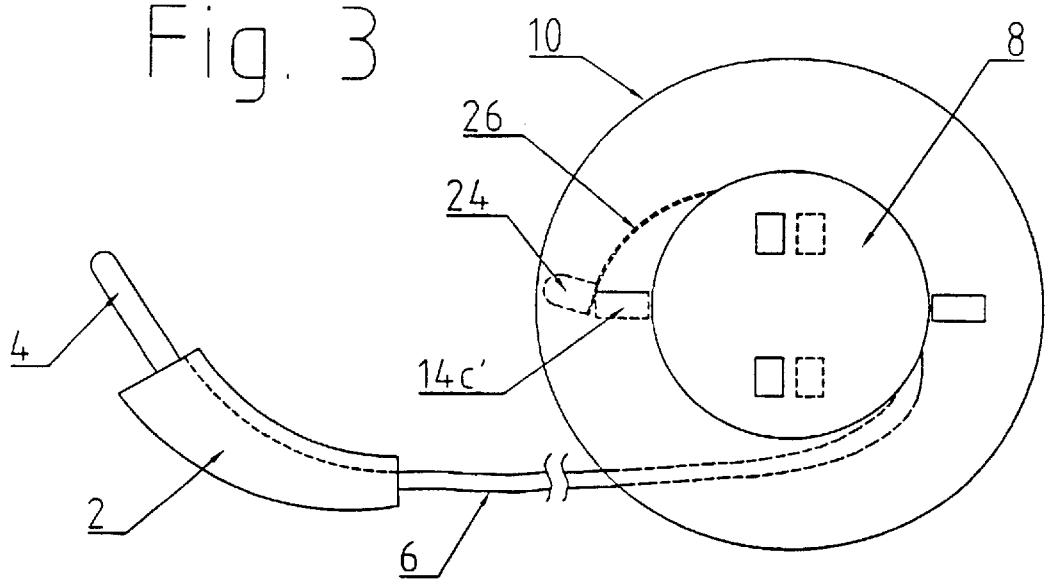
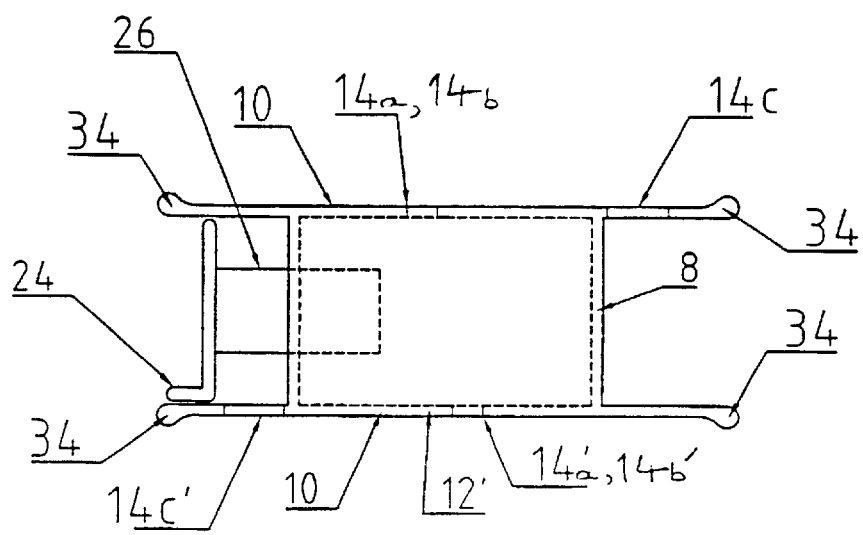

ELECTRICAL EXTENSION LEAD OR ADAPTER

The present invention relates to an electrical extension lead arrangement or adapter comprising a plug, at least one socket, and an extension lead connecting the or each socket to the plug.

Electrical extension leads and adapters comprising extension leads with plugs and sockets are known. These are typically bulky. Such extension lead arrangements and adapters are perfectly suitable for occasional domestic or industrial use, where space is not a problem. However, such arrangements or devices are not particularly suitable for, for example, travel and they are not easily portable or particularly discrete.

The present invention aims to provide an extension lead arrangement or electrical adapter which is light and compact and, therefore, relatively easily portable and which is also safe to use.

According to a first aspect, therefore, the present invention provides an electrical extension lead arrangement comprising a plug, a socket and an electrical lead connecting the socket to the plug, wherein the socket is provided in a body around which the electrical lead is windable, characterised in that unless the electrical lead is fully unwound from the body, no electrical connection can be made between a connector pin and the socket.

The present invention in a preferred embodiment relates to an electrical adapter comprising a plug, a socket, and an extension lead connecting the socket to the plug, in which the socket is disposed in a body around which the extension lead is windable such that while the lead is at least partially wound, insertion is prevented of a pin of a connector in a hole of said socket so as to prevent electrical connection to the connector.

This advantageously avoids the risk of excessive heating of the extension lead. Such excessive heating can occur in prior art leads or adapters which are usable with their extension leads wound.

Preferably the pin of a connector is prevented from being inserted in the hole of the socket by abutment of the pin with the extension lead prior to full insertion. Alternatively the socket can be provided with a shutter, the shutter being movable to an open position by unwinding the extension lead. The shutter can be held in its closed position by the wound or partially wound extension lead, and can be spring-biased to its open position when the extension lead is unwound.

The invention in its second aspect relates to an electrical adapter comprising a plug, a socket, an extension lead connecting the socket to the plug, a body around which the extension lead is windable, the body comprising two end plates, characterised in that the plug comprises means for cooperative engagement with at least one of the end plates. The plug preferably clip-fits over or between peripheral lips provided on each end plate.

In a preferred embodiment, this advantageously provides an electrical adapter which is compact and in which the plug is attached to the body so as to prevent the lead unwinding during transport and storage.

Preferably, the means for cooperative engagement comprises a groove. The groove preferably comprises opposing side walls, each lip engaging with a corresponding one of the side walls.

Preferably, the lips have outwardly projecting lands and the corresponding side walls have inwardly projecting lands, such that when the plug is clip-fitted, the lands cooperate to hold the plug in place on the body.

Preferably upon the lead being at least partially wound, insertion of a pin of a connector in a hole of the or each socket is prevented so as to prevent electrical connection to the connector.

The electrical extension lead arrangement or adapter can preferably include a second adapter also having a groove for cooperative engagement with the lips. The second adapter can preferably be a housing for a socket on which plug pins are mounted.

The present invention in its third aspect relates to an electrical extension lead arrangement or adapter according to the present invention in its first aspect and in its second aspect.

The plug can be a UK standard plug, such as a 13 amp plug, or can be a plug of any other type, such as in accordance with U.S. and/or European standards. The or each socket can be a UK standard socket, such as a 13 amp socket, or a socket of any other type, such as in accordance with U.S. and/or European standards.

The device preferably comprises two sockets. The two sockets are preferably positioned with their socket holes at opposite ends of the body. Preferably the live contacts of the sockets are adjacent, and the neutral contacts of the sockets are adjacent, for ease of interconnection.

An earth contact can be provided on the body for connection in use to an earth pin of a UK standard plug inserted into one of the sockets, with the earth contact being connected via the extension lead to the plug.

In accordance with a further aspect of the invention, there is provided an electrical extension lead arrangement comprising a plug, two sockets and an electrical lead connecting the sockets to the plug, wherein the sockets are provided in opposing end surfaces of a body around which the electrical lead is windable, and wherein the sockets are arranged such that the holes of the sockets provided in one end surface of the body are located at the same positions on the end surface as the corresponding holes of the other socket in the other end surface.

This particular feature provides an electrical extension lead or an adapter which is particularly compact. A single contact strip or wire can be provided between the corresponding holes of the two sockets.

Figure 2:
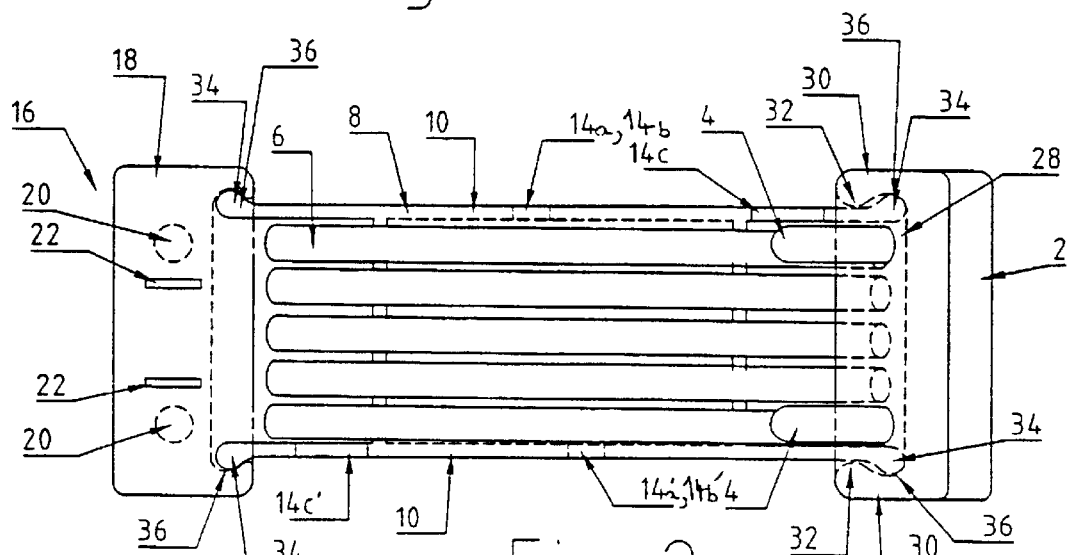
Figure 5:
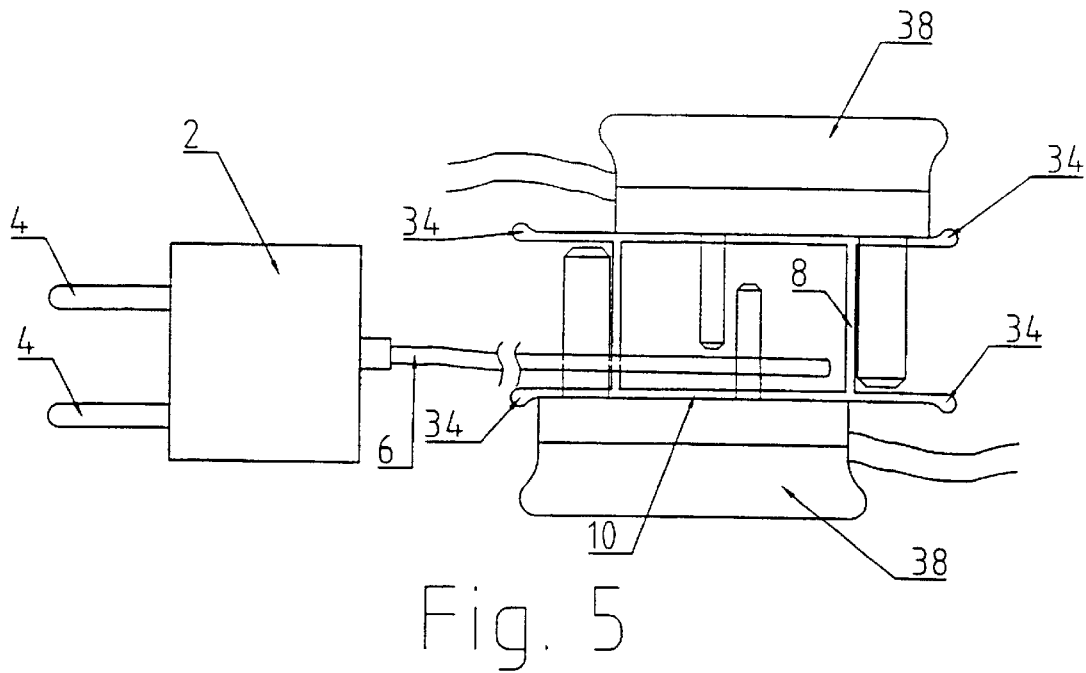
Figure 6:
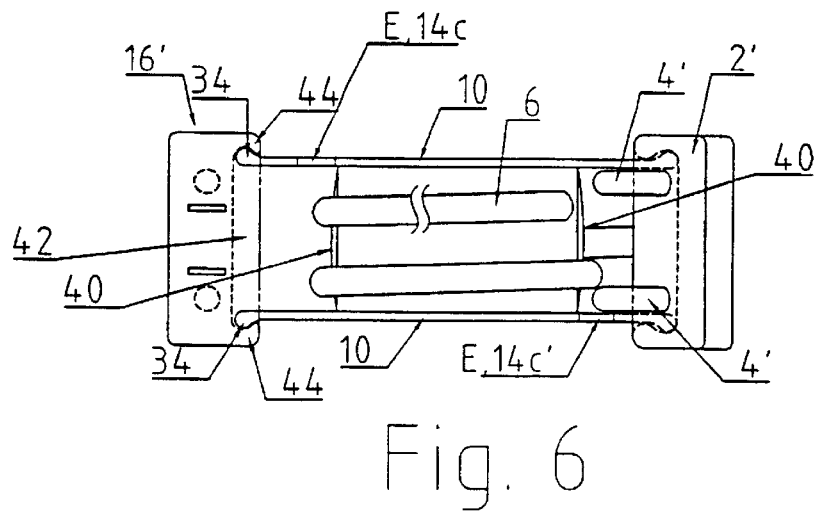
Figure 7:
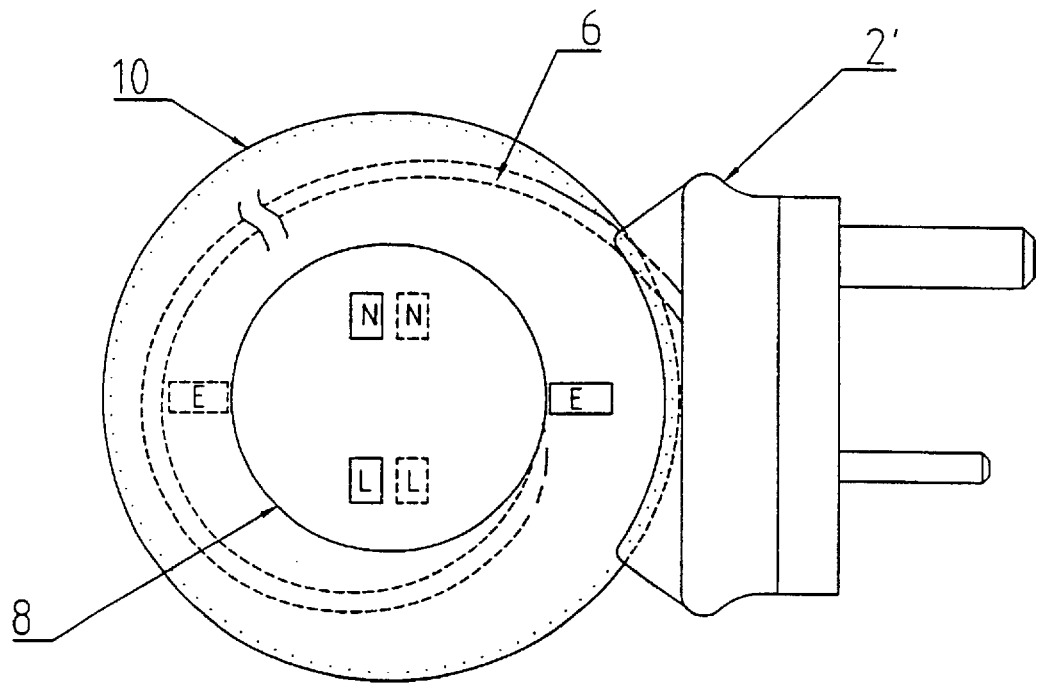
Figure 8:
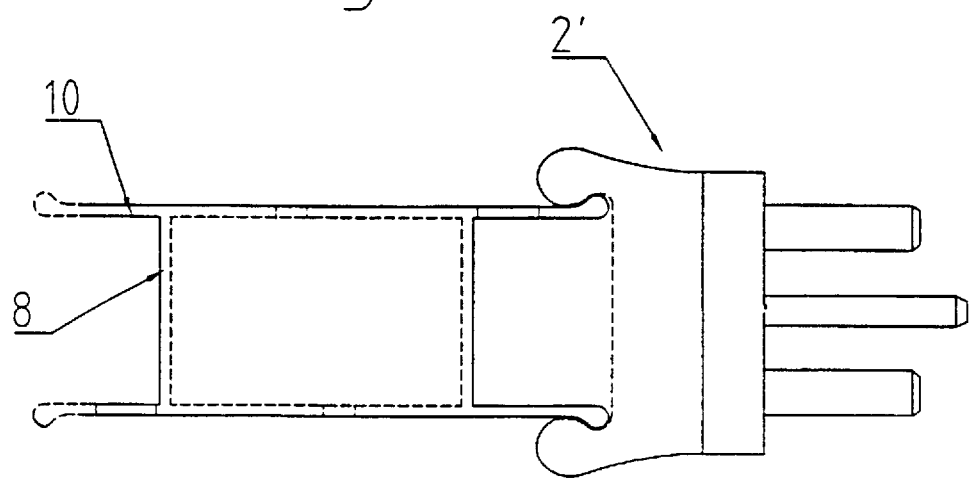
Figure 9:
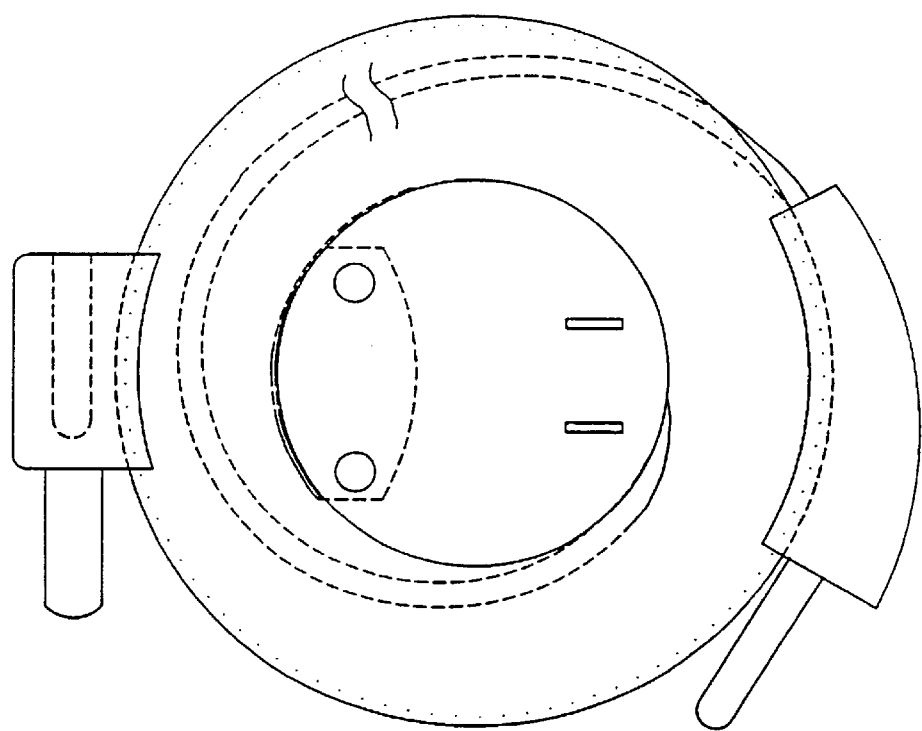
Figure 10:
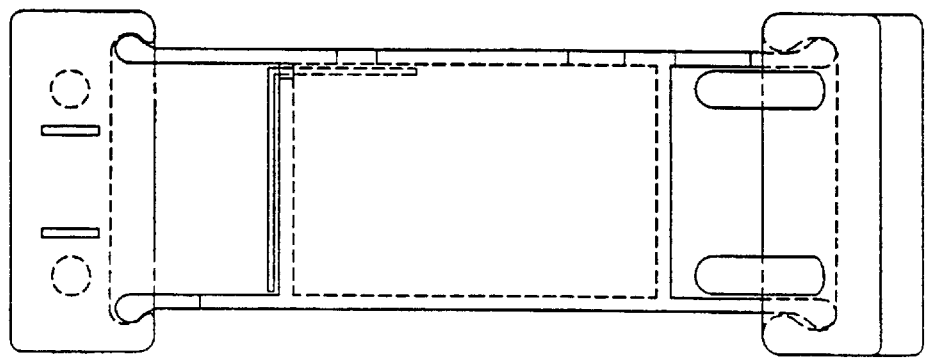

Preferred embodiments of the invention will now be described by way of example and with reference to the drawings, in which:

FIG. 1 is a diagrammatic top view of an adapter according to a first embodiment of the invention, FIG. 2 is a diagrammatic side view of the adapter shown in FIG. 1 with the extension lead wound, FIG. 3 is a diagrammatic side view of the adapter shown in FIG. 1 with the lead unwound, FIG. 4 is a diagrammatic top view of the adapter shown in FIG. 1 with the lead unwound and earth hole shutter in an open position, FIG. 5 is a diagrammatic side view of the adapter with two United Kingdom standard plugs fitted, FIG. 6 is a diagrammatic side view of an adapter according to a second embodiment, FIG. 7 is a diagrammatic top view of an adapter according to a third embodiment, FIG. 8 is a diagrammatic side view of the adapter shown in FIG. 7, FIG. 9 is a diagrammatic top view of an adapter according to a fourth embodiment, and FIG. 10 is a diagrammatic side view of the adapter shown in FIG. 9.

The device will be referred to as an adapter. This should be read to include any extension lead arrangement having a plug and a socket connected via an electrical extension lead.

As shown in FIG. 1, the adapter consists of a plug 2 having pins 4 connected by way of an extension lead 6 wound around a cylindrical body 8 having end plates 10. A socket 12 comprising a live hole 14a, a neutral hole 14b and an earth hole 14c, is disposed on one of the end plates 10. A second socket 12' comprising a live hole 14a', a neutral hole 14b' and an earth hole 14c' is disposed on the opposite end plate 10. The sockets 12, 12' are conventional UK standard 13 amp sockets.

There is a secondary adapter 16 consisting of a housing 18 in which a socket 20 is disposed and on which plug pins 22 are mounted. The secondary adapter 16 can be connected to plug 2 in use; for example to connect pins 4 of, for example, a round European type to pins 22, of for example, a flat U.S. type.

As shown in FIGS. 1 and 3, a shutter 24 is provided over each of the earth holes. For simplicity, only one of the shutters has been shown. Each shutter 24 is mounted to the body 8 by an arcuate leaf spring 26.

As shown in FIG. 2, the plug 2 has a groove 28 with side walls 30. Each side wall 30 has an inwardly extending portion or land 32.

The end plates 10 of the body 8 have peripheral lips 34 with lands 36 extending axially outwardly relative to the body 8. The groove 28 of the plug 2 is dimensioned so as to accommodate both lips 34 of the end plates 10. The lands 32 and 36 of the plug 2 and body 8 respectively cooperate so as to retain the plug on the body with a clip-fit.

As shown in FIGS. 3 and 4, the plug 2 can be readily manually removed from the body end plates 10 and the extension lead 6 can be unwound so as to make the adapter ready for use.

As shown in FIGS. 1 and 2, when the electrical extension lead is wound, the spring 26 is pressed against the body 8 such that the shutter 24 takes a closed position covering the earth socket hole.

As shown in FIG. 3, only when the extension lead 6 is unwound does the shutter 24 move to open the earth socket hole 14c' due to spring biasing of the spring 26. A UK standard plug can then be inserted into the socket 12'.

As shown in FIG. 5, once the extension lead 6 is unwound, UK standard plugs 38 can be connected. These plugs 38 are for connection to electrically powered devices.

If it is preferred that the earth pin of the plug is not exposed when inserted in the socket, a housing (not shown) may be provided between the end plates, radially outwards of the pin of the inserted plug 38.

In an alternative embodiment, no springs 26 and shutters 24 are provided. However, it is still not possible to connect a mains plug into a socket 12, 12' whilst the extension lead 6 is wound, because the earth pin (not shown) of the standard plug (not shown) would abut the wound extension lead 6 preventing the plugs 38 from being inserted into the sockets 12, 12' and an electrical connection being made.

The shutters 24 and springs 26 are made of polypropylene or similar flexible materials. Such materials are resilient, even after many flexures.

The sockets 12, 12' which are on opposite end plates 10 are back to back. The live socket holes 14a, 14a' are adjacent, and neutral socket holes 14b, 14b' are adjacent, so as to be readily interconnected.

FIG. 6 shows a second embodiment of the invention which is essentially the adapter of FIGS. 1 to 5 provided with additional flexible metal strips 40 adjacent to the earth socket holes 14c, 14c'. When UK standard plugs (not shown) in FIG. 6 are inserted, these earth connections are made as well as the live and neutral connections. In this embodiment, the plug 2' connected to the extension lead 6, can include an earth contact, or can include an earth connection so as to provide an earth connection to a secondary adapter 16' having an earth pin (not shown).

As shown in FIGS. 1, 2 and 6, a secondary adapter 16, 16' is clip-fittable to the end plates 10. Like the plug 2, 2' it has a groove 42 with side walls 44 for cooperative engagement with the lips 34 of the end plates 10 of the body 8. More than one secondary adapter 16' can be clipped to the end plates 10, 10 of the body 8.

The surfaces of the lips 34 of the end plates 10 on the body 8 can be either plain or serrated. The end plates 10 are resiliently flexible aiding ready clip 10 fitting of the plug 2 and secondary adapter 16, 16'.

The plug 2, 2' can be any of many types. For example, an adapter showing a UK standard 3-pin plug 2' connected to the extension lead 6 is shown in FIGS. 7 and 8.

In further embodiments, the UK standard 3-pin sockets can be replaced by other sockets. An example is shown in FIGS. 9 and 10 where the socket on one side is for a plug with two round cylindrical pins and the socket on the other side is for a plug with two flat pins. In some embodiments, a shutter, in particular as previously described, for any of or all of the socket holes can be provided to prevent insertion of plugs without unwinding the extension lead. The shutter is held in place by the wound extension lead, but springs out of the way when the extension lead is unwound.

Any combination of foreign and/or UK standard plugs and sockets can be included in adapters according to the invention. Alternatively, plugs and sockets according to a single standard can be used. The sockets 12, 12' can include fuses.

Particularly when wound and with the plug and secondary adapter, if any, clip-fit to the body, a compact adapter is provided. For example, an adapter can be provided having a diameter of less than 10 cm, for example 6.8 cm.

Extension leads and adapters according to the present invention are particularly useful for holiday makers and business users in hotels and apartments which are generally provided with few sockets. They are particularly useful for business users requiring use of various, or multiple, appliances such as laptop computers, printers, mobile phone recharge units, computer projectors, and modems.

We claim:

1. An electrical extension lead arrangement comprising a first electrical connector, a second-electrical connector, an electrical lead by way of which the first connector is electrically connected to the second connector, and a body around which the electrical lead is windable, said second connector being in the form of a socket provided in and fixed relative to said body, the arrangement being such that unless at least the majority of the electrical lead is unwound from the body, no electrical connection can be made between a third connector and the socket, and the arrangement also being such that until a pin of said third connector is substantially fully inserted into a hole of said socket, electrical current flow between said third connector and said first connector by way of said second connector and said electrical lead is prevented.

2. An arrangement according to claim 1, wherein unless the electrical lead is substantially fully unwound from the body, no electrical connection can be made between the third connector and the socket.

3. An arrangement according to claim 1, and further comprising a fourth electrical connector in the form of a second socket which is provided in and fixed relative to said body and which is electrically connected by way of said electrical lead to the first connector, the sockets being provided in opposing end surfaces of said body, and the sockets being situated such that said hole is located at a position in the adjacent end surface of the body corresponding substantially to a position at which a corresponding hole of the second socket is located in the other end surface of the body.

4. An arrangement according to claim 1, and further comprising a fourth electrical connector, the fourth connector having a device for co-operative engagement with the body.

5. An arrangement according to claim 4, wherein the fourth connector comprises an adaptor having a socket and plug pins.

6. An arrangement according to claim 1, wherein until at least the majority of the electrical lead is unwound from the body, full insertion of said pin into said hole of said socket is prevented so as to prevent electrical connection of said third connector with the first connector.

7. An arrangement according to claim 6, wherein said pin is prevented from being fully inserted in said hole by abutment of the pin against the extension lead.

8. An arrangement according to claim 6, and further comprising a shutter movable between a closed position preventing full insertion of the pin into said hole and an open position allowing full insertion of the pin into the hole, the arrangement being such that the shutter is held in its closed position by said lead until at least the majority of said lead has been unwound from said body.

9. An arrangement according to claim 8, wherein the shutter comprises a leaf spring whereby the shutter is biased to move into its open position.

10. An arrangement according to claim 1, wherein the first connector is releasably attached to the body so as to prevent the lead from unwinding during transport and storage of the arrangement.

11. An arrangement according to claim 10, wherein the body comprises two end plates, and said first connector comprises a device for co-operative engagement with at least one of the end plates.

12. An arrangement according to claim 11, wherein the device for co-operative engagement comprises a groove.

13. An arrangement according to claim 11, and further comprising peripheral lips provided on the end plates and serving to co-operate with said device.

14. An arrangement according to claim 13, wherein said first connector clip-fits over or between said peripheral lips.

15. An arrangement according to claim 13, wherein the device for co-operative engagement comprises a groove, and wherein the groove comprises opposing side walls, each lip engaging with a corresponding one of the side walls.

16. An arrangement according to claim 15, and further comprising outwardly projecting lands of the lips and inwardly projecting lands of the corresponding side walls, whereby when the first connector is clip-fitted to the end plates, the outwardly projecting lands co-operate with the inwardly projecting lands to hold the first connector in place on the body.

* * * * *